United States Patent

[11] 3,552,570

| [72] | Inventor | Arthur W. Busch |
| | | Houston, Tex. |
| [21] | Appl. No. | 867,558 |
| [22] | Filed | Oct. 20, 1969 |
| [45] | Patented | Jan. 5, 1971 |
| [73] | Assignee | Wastech, Inc. |
| | | a corporation of Texas |

[54] LIQUID TREATING APPARATUS
9 Claims, 7 Drawing Figs.

[52] U.S. Cl. .................................................. 210/197,
210/208, 210/220
[51] Int. Cl. ..................................................... C02c 1/12
[50] Field of Search ........................................... 210/194,
195, 197, 220, 221, 208, 219, 256, 520

[56] References Cited
UNITED STATES PATENTS
3,338,827   8/1967   Mausolf....................... 210/197X

*Primary Examiner*—J. L. DeCesare
*Attorney*—Pravel, Wilson & Matthews

ABSTRACT: An apparatus for the biological treatment of dilute aqueous streams containing dissolved organic substances, or for other chemical or biochemical treatment of waste water or other liquids, wherein means are provided for controlling the process reaction rate of the liquid as it flows through the apparatus.

Arthur W. Busch
INVENTOR

BY

Pravel Wilson & Matthews
ATTORNEYS

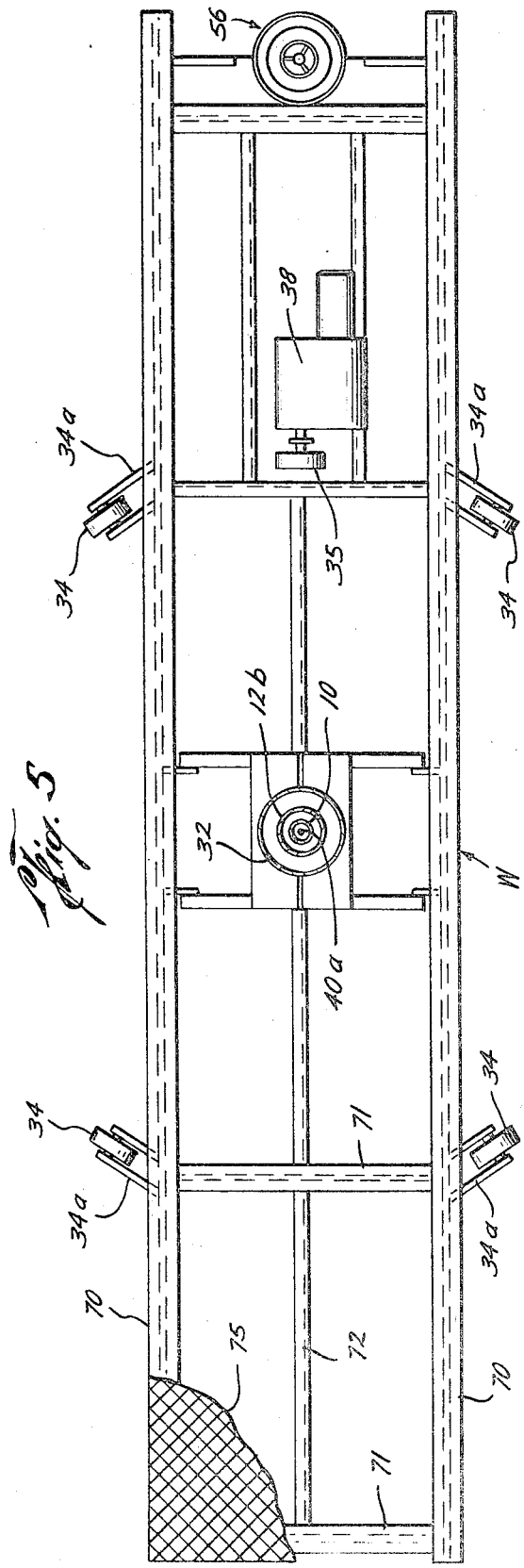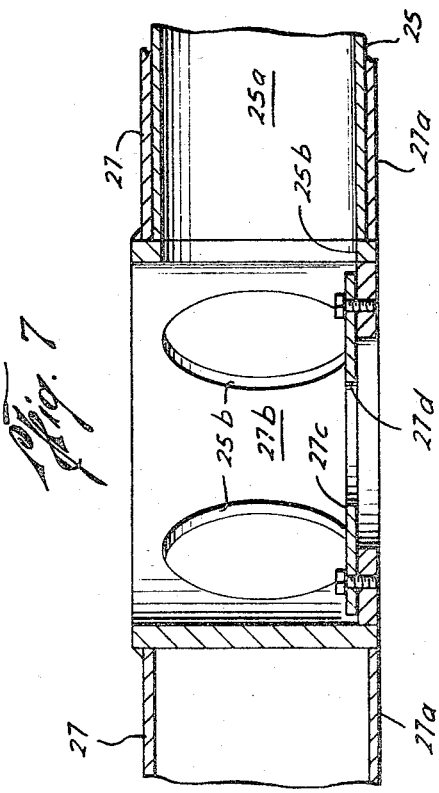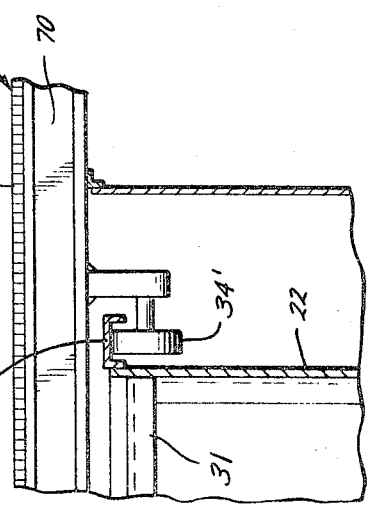

LIQUID TREATING APPARATUS

BACKGROUND OF THE INVENTION

The field of this invention is liquid treating apparatus, and particularly apparatus for controlling biochemical reaction rates of a liquid flowing through the apparatus.

Various types of liquid treating apparatus have been used in the past for various applications, and each of which has certain disadvantages and shortcomings, particularly insofar as the control of the reaction rate of the liquid flowing through the apparatus is concerned. Examples of such prior art apparatus are found in U.S. Pats. Nos. 2,245,587; 2,355,069; 2,404,223; 2,673,181; 2,678,915; and 2,820,758.

SUMMARY OF THE INVENTION

This invention relates to an apparatus having a relatively large mixing and reaction chamber, which may be used for initiating a biological or chemical reaction, and which is disposed for the discharge of liquid therefrom to a clarification and sedimentation section, and with rotating arms being provided for creating a secondary internal recirculation from the sedimentation section into the mixing chamber for controlling the rate of reaction in the chamber. When the reaction in the apparatus is biological oxidation for the conversion of dissolved organic compounds in waste water into bacterial cells, an excess of micro-organisms is produced and removed under controlled conditions with this apparatus. The mixing and reaction chamber is preferably a floating chamber which is caused to float upwardly by reason of the aeration of the liquid in the chamber creating a lighter density fluid internally of the chamber as compared to the fluid in which the chamber is disposed, and such upward floating is utilized for imparting rotation to the chamber.

BRIEF DESCRIPTION OF THE DRAWING

FIG. 5 is a plan view of the preferred form of the invention shown in FIG. 1, with certain parts thereof removed for illustration purposes;

FIG. 6 is a partial vertical sectional view illustrating a modified form of the apparatus of FIG. 1; and FIG. 7 is an enlarged view of a portion of the lower part of the chamber of FIG. 1.

DESCRIPTION OF THE PREFERRED EMBODIMENTS

Figure 1:
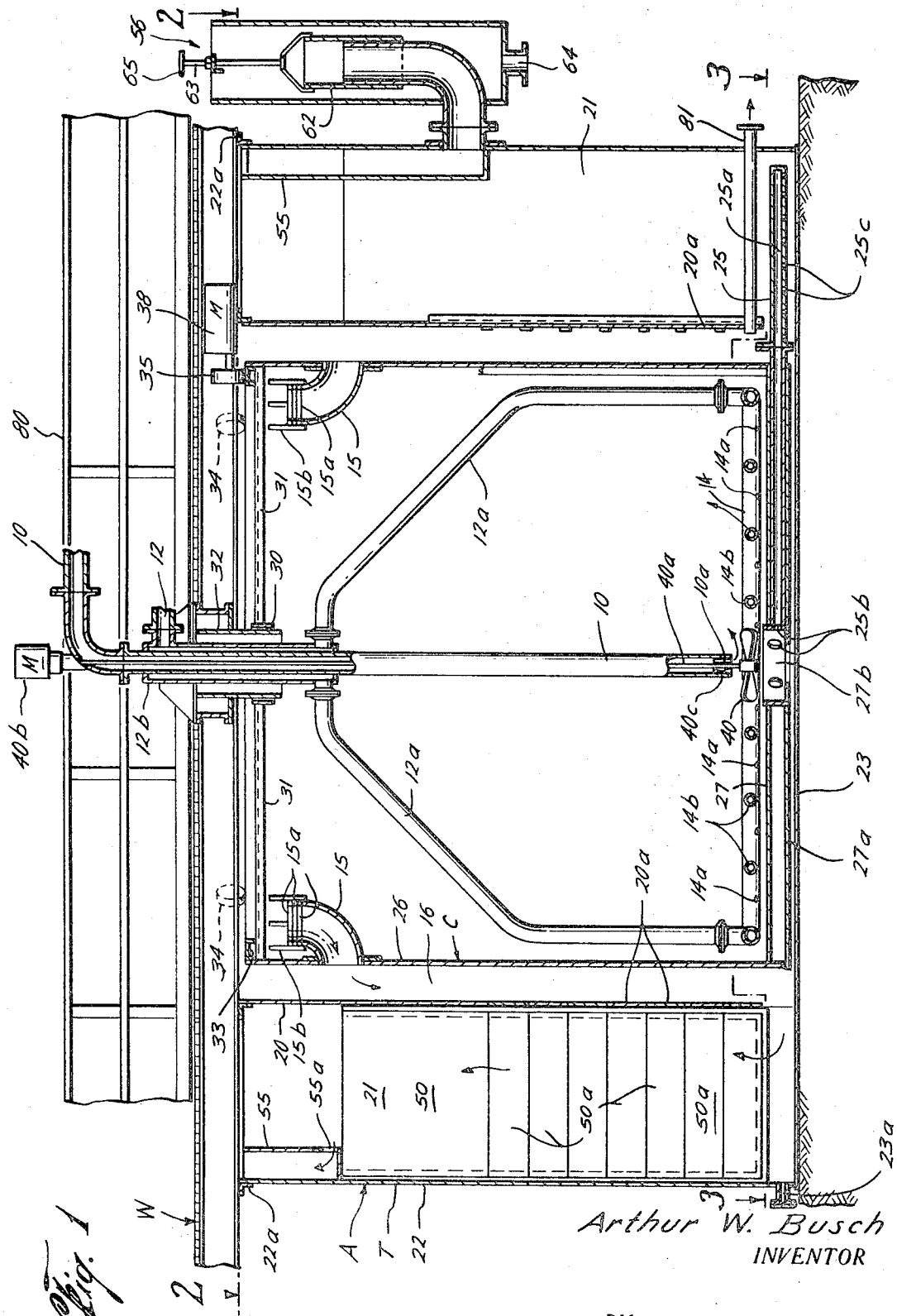
FIG. 1 is a vertical sectional view, partly in elevation, of the apparatus of this invention.

In the drawings, the letter A designates generally the apparatus of this invention which is especially suitable for the biological, chemical or biochemical treatment of waste water or other liquids. The apparatus A includes a tank T which has an inner chamber C therein wherein mixing and reaction essentially takes place. The waste water or other liquid which to be treated is introduced through an inlet pipe or opening 10, and it preferably discharges through the lower end 10a within the chamber C (FIG. 1) to create a primary circulation within the chamber C for mixing. When oxygen, air or other gas is used in the mixing and/or treatment of the liquid, such oxygen, air or gas is introduced through an inlet pipe 12 which distributes the air or gas, preferably through a substantially circular tube 14 at the lower portion of the chamber C, as will be more evident hereinafter. The liquid which has been treated in the chamber C is discharged through one or more discharge pipes or outlets 15 into an annular flow passage 16 externally of the chamber C and inwardly of longitudinally extending baffle wall 20. The baffle wall 20 is preferably cylindrical in shape and is open at the lower end so that the fluid may circulate downwardly and then upwardly so as to define a clarification and sedimentation section 21 between the baffle wall 20 and the sidewall 22 of the tank T. As will be explained in detail, a secondary recirculation of fluid and solids therewith is effected from externally of the chamber C to internally thereof by means of a plurality of rotatable tubular arms 25 (FIGS. 1 and 3) which are preferably rotated with the chamber C. The rate of biological, chemical or biochemical reaction in the apparatus A is partially controlled by controlling the speed of movement of the rotating arms 25, and the rate of flow of the fluid through the apparatus A.

Considering the apparatus A more in detail, the tank T is preferably cylindrical and therefore the sidewall 22 is preferably cylindrical. The tank 22 also has a bottom 23 which is closed except for a drain outlet 23a, which is normally maintained in a closed position by a cover plate or suitable valve (not shown). The upper end of the tank T is essentially open, and it has a walkway W supported thereon, and preferably welded to the sidewalls 22, as will be more fully explained.

Figure 3:
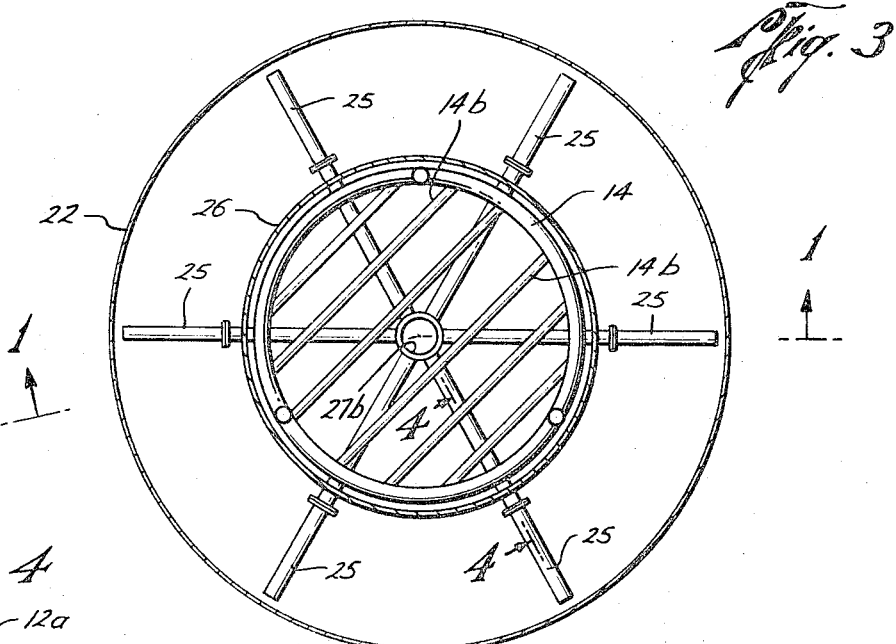
FIG. 3 is a view taken on line 3-3 of FIG. 1, on a reduced scale as compared to FIG. 1, and showing further details.
Figure 4:
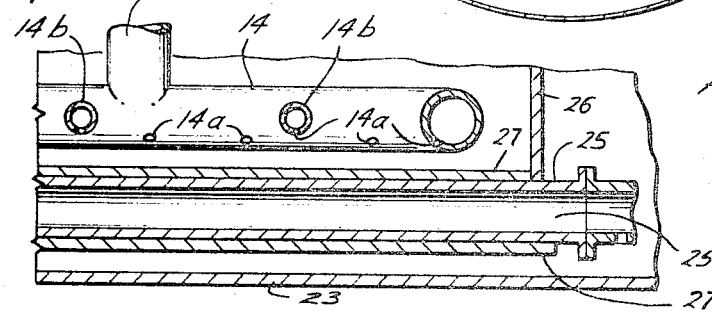
FIG. 4 is a sectional view taken on line 4-4 of FIG. 3.

In the preferred form of the invention, the chamber C is substantially centrally disposed within the tank T and it has a relatively large volume as compared to the rest of the tank T. The chamber C has a cylindrical sidewall 26, and a double wall bottom having circular plates 27 and 27a which define a closed chamber in the bottom of the chamber C for controlling the floatability of the chamber C. A central opening defined by a ring 27b is provided in the bottom chamber for the circulation of fluid upwardly therethrough and into the interior of the chamber C, as will be more fully explained. The tubular arms 25 may vary in number, but in the preferred form of the invention there are six of such arms 25 (FIG. 3). One of such arms 25 has been omitted from the lefthand portion of FIG. 1 to more clearly illustrate the double wall lower chamber defined by the bottom walls 27 and 27a. It will be understood that the rotatable arms 25 are secured to the chamber C and rotate therewith. Each of the arms 25 is hollow and has a longitudinal bore or opening 25a extending for substantially the full length thereof and terminating in an inner open end 25b. A plurality of longitudinally spaced openings 25c are formed, preferably along the lower portion of the arms 25 to serve as inlet openings for the circulation of liquid from the clarification and sedimentation section 21 through the arms 25 and into the interior of the chamber C. Each of the arms 25 extends outwardly to the sidewall 22, or substantially to same, so that when the arms 25 are rotated, the entire lower portion of the tank T is covered by such arms 25 to facilitate the recirculation of the liquid and solids therewith from the section 21 into the interior of the chamber C.

For controlling the extend of fluid flow through the opening formed by the ring 27b, a control orifice ring or plate 27c is preferably employed (FIG. 7) so that the opening 27d therein may be readily varied as desired.

A central bearing sleeve 30 is connected at the upper end of the chamber C by any suitable braces such as angle iron members 31 which are welded to the wall 26 of the chamber C and also to the bearing sleeve 30 (FIG. 1). The sleeve 30 is disposed around a guide tube 32 which is fixed so that the sleeve 30 may rotate relative thereto when the chamber C is rotated. The guide tube 32 is welded or otherwise secured to the walkway W or any other suitable structure disposed at the upper end of the chamber C.

Figure 2:
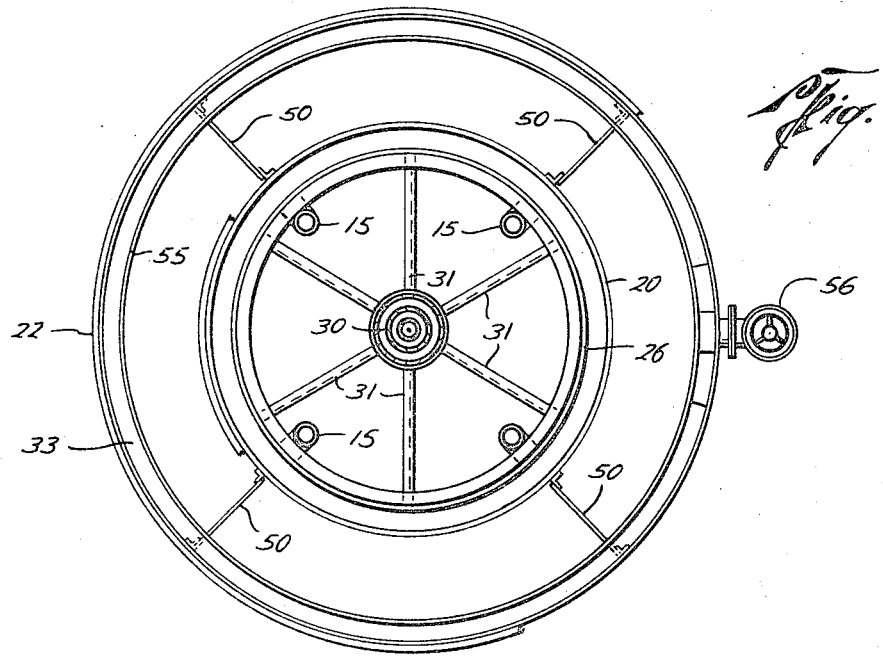
FIG. 2 is a view taken on line 2-2 of FIG. 1, on a reduced scale, and showing more details of the preferred form of the invention shown in FIG. 1.

An annular track formed by a circular inverted channel member 33 (FIGS. 1 and 2) is provided for engagement with a plurality of rollers 34 mounted on the walkway W (FIGS. 1 and 5) and a drive roller 35. As will be explained, the chamber C is caused to float upwardly so as to exert a constant upward force by the track 33 against the wheels or rollers 34 and 35. The wheels 34 are merely idler or guide wheels, whereas the wheel or roller 35 is a driven wheel which is driven by any suitable power means such as an electric motor 38 having a variable speed control or gear box therewith. Thus, when the wheel or roller 35 is rotated, the frictional engagement between such roller 35 and the track 33 imparts rotation to the track 33 and the entire chamber C therewith. Rotation is also thus imparted to the arms 25 which are secured to the lower end of the chamber C, as previously explained. When the chamber C moves downwardly so that there is no contact between the drive wheel 35 and the track 33, the rotation of the chamber C is automatically discontinued so that when the process is not in operation, the rotation of the chamber C is automatically stopped even though the motor 38 and the wheel 35 may continue to operate.

Oxygen, air or other gas used in the treatment of the liquid flowing through the apparatus A is introduced through the pipe or passage 12 and it flows downwardly through the tubes 12a to the circular distribution pipe 14 in the lower portion of the chamber C (FIG. 1). Such distribution pipe 14 has a plurality of outlet openings 14a which are distributed, preferably on the lower inward portion of the pipe 14 for obtaining a satisfactory distribution of the oxygen or other gas throughout the entire lower portion of the liquid within the chamber C so that such oxygen or other gas is available for reaction within the mixing chamber C. Preferably the ring 14 has a plurality of laterally extending distribution tubes 14b (FIGS. 1 and 3) which also have discharge openings 14a in their lower portions. The oxygen or other gas also contributes to mixing as it rises, and any excess gas is released through the open upper end of the chamber C. The waste water or other liquid which is to be treated is introduced through the inlet pipe 10 and discharges through the lower end 10 a, as previously explained. If desired, a propeller or paddle 40 may be disposed in the lower portion of the chamber C and may be operated through a shaft 40a which extends to a suitable source of power such as a motor 40b. A bearing or other support 40c is provided at suitable points within the pipe 10, and without substantially interfering with the flow of the waste water or other liquid which is being introduced into the chamber C.

The discharge pipes 15 from the chamber C into the annular space 16 externally thereof are preferably provided with control weirs formed by removable weir rings 15a. The weir rings 15a are removable retained in place by vertically extending retainers 15b, whereby the height of the liquid within the chamber C may be regulated by the height of the weir rings 15a. To facilitate the creation of a quiescent zone within the clarification and sedimentation section 21, a plurality of vertically extending lateral baffle plates 50 (FIGS. 1 and 2) are secured between the baffle wall 20 and the tank wall 22. Each of the baffle walls 50 is preferably made of a plurality of removable lower sections 50a which are suitably detachable from the walls 20 and 22 so as to vary the effect of such baffles within the quiescent zone. It will be understood that the clear effluent will be at the upper portion of the sedimentation and clarification section 21 while the micro-organisms or solids are at the lower portion of such section 21. However, with the apparatus of this invention, it is desirable to create a continuous movement of the micro-organisms in a recirculation by means of the rotating arms 25, as explained, so it is desirable to have a equilibrium between the quiescent zone and the fluid moving in recirculation. Therefore, the height of the baffle plates 50 are suitably adjusted for different operating conditions by removing the lowermost one or more baffle plates 50a as desired. Also, lower portions 20a of the cylindrical baffle wall 20 may be removed to modify the movement of the fluid as it flows from the annular space 16 into the section 21 and then outwardly to discharge.

The overflow or discharge of the clear effluent is preferably through an annular channel 55 having inlets ports 55a (FIG. 1) and an outlet valve 56.

The level of the fluid in the clarification and sedimentation section 21 may be controlled by any suitable means such as a circular weir 62 which is vertically adjustable by a threaded shaft 63 having a control handle 56 therewith. Since the discharge effluent from the channel 55 must flow over the top of the adjustable circular weir 62, the level above water or effluent within the chamber 21 is thus set by the upper edge of the weir 62. The effluent discharge is over such weir 62 and flows outwardly through an opening or outlet 64 (FIG. 1) for disposal or other disposition.

The walkway W is provided for supporting personnel and it preferably includes I-beams 70 which are disposed parallel to each other and are preferably welded to suitable supports on the edge of the sidewall 22 as indicated at 22a (FIG. 1). Lateral bracing 71 extends between the I-beams 70, and additional longitudinal bracing 72 may also be employed as desired and as necessary for suitable strength. The rollers or wheels 34 are preferably mounted on supports 34a which are welded or are otherwise secured to the I-beams 70 so as to engage the track 33, as previously explained. An enlarged portion 12b for the air inlet 12 is preferably welded or otherwise secured to the structure at the walkway W, as seen in FIG. 5, although any suitable support or connection may be provided, preferably so that the apparatus may be readily disassembled for cleaning, repair or modification. A side rail 80 (FIG. 1) is provided on each side of the walkway W to protect personnel and prevent them from falling. Also a suitable grate or heavy screen 75 is welded or is otherwise secured across the upper surface of the walkway W (only a portion of which is shown) so as to support the personnel thereon.

In the operation or use of the apparatus A of this invention for biological or biochemical treatment, waste water having organic compounds dissolved therein is introduced through the pipe 10 and is thus circulated in the primary circulation within the chamber C. Oxygen in its pure form or in air is preferably circulated through the inlet 12, its enlargement 12b and its pipes 12a to the distribution ring 14 and its distribution tubes 14b. The gas is caused to bubble and disperse upwardly through the waste water within the chamber C, causing the density of the liquid to become reduced as compared to the water externally of the chamber C, and therefore, causing the chamber C to rise upwardly until the track 33 engages the wheels or rollers 34 and 35. The motor 38 operates the drive wheel 35 to thus impart rotation to the chamber C and to the arms 25 therewith. The liquid within the chamber C discharges over the adjustable weir rings 15a and outwardly through the discharge tubes 15 into the annular space 16.

The liquid flows downwardly because of the baffle plate 20 which extends from the upper end of the tank T above the level of the liquid. Such fluid is caused to flow in a direction below the baffle wall 20 and into the sedimentation and clarification chamber 21. A quiescent zone is created in such section which causes the upper portion of the liquid to become clarified and causes the solids to separate and tend to settle towards the lower portion of such section 21.

Because of the rotating arms 25, such solids, which are largely micro-organisms needed for the production of the bacterial cells within the chamber C, are circulated in a secondary recirculation back to the chamber C through the arms 25. The rate of reaction within the chamber C may be maintained by controlling the rate of movement of the arms 25, the organism concentration, and the flow of fluid through the apparatus A together with the control of the other variables known to those skilled in the art.

When chemical treatment is desired, chemicals may be introduced directly into the mixing chamber C with the liquid through the inlet pipe 10, or through any other suitable inlet pipe (not shown).

The solids or micro-organisms which are not needed for recirculation may be removed through a sludge effluent tube or pipe 81 (FIG. 1) near the lower end of the tank T, but above the rotating arms 25. A valve (not shown) or any other suitable control may be provided on the pipe 81 for regulating the extent of such discharge of the solids from the tank T.

A modified form of the apparatus of this invention is illustrated in FIG. 6, wherein like parts have the same numerals and/or letters as used in the other (FIGS. of the drawing. In the modification of FIG. 6, the trackway 33 has been replaced by a trackway 33' which is welded or is otherwise secured to the external upper portion of the cylindrical wall 22. The trackway 33' is also circular and is preferably formed in an inverted channel shape as shown in FIG. 6. FIG. 6 illustrates one of the support rollers 34' which is suspended from one of the I-beams 70. A plurality of such rollers 34' are disposed in substantially the same position as the rollers 34 shown in FIG. 5 so as to provide a support for the trackway 33'. A drive roller such as the roller 35 engages the lower surface of the trackway 33' for imparting rotation to the trackway 33' and the central chamber C. The modified structure of FIG. 6 thus differs from the structure shown in the other FIGS. in that the chamber C is rotated and is supported at all times by the rollers 34' and the drive roller 35. The chamber C therefore does not float upwardly in such embodiment, and means may be provided if desired to prevent any upward movement of the chamber C in those situations wherein aeration occurs in the chamber C.

The foregoing disclosure and description of the invention are illustrative and explanatory thereof, and various changes in the size, shape, and materials as well as in the details of the illustrated construction may be made without departing from the spirit of the invention.

I claim:

1. An apparatus for the biological, chemical, and biochemical treatment of waste water and other liquids, comprising:
   a tank having a sidewall and a bottom;
   an inner mixing and reaction chamber disposed in the central portion of said tank and having a sidewall and a bottom with a secondary recirculation opening in the bottom;
   a clarification and sedimentation section of said tank positioned externally of said inner chamber;
   means for introducing liquid to be treated into said chamber;
   means for introducing gas into said chamber for creating a primary circulation of the liquid in said chamber upwardly;
   said channel having a discharge near its upper end into said clarification and sedimentation section;
   a treated liquid outlet from said tank near the upper end of its sidewall for the flow of fluid from said tank after treatment and clarification;
   a plurality os substantially horizontally disposed tubular arms mounted on the lower end of said inner chamber and extending from said secondary recirculation opening into the lower portion of said clarification and sedimentation section for establishing communication for the flow of fluid from said section to said opening in said chamber;
   drive means for rotating said arms to facilitate a flow of fluid and solids therewith from said section to said chamber for creating a secondary internal recirculation from the bottom of said chamber upwardly therein; and
   means for controlling the rotation of said tubular arms in relation to the flow of fluid through said tank to thereby control the rate of the biological, chemical or biochemical reactions.

2. The apparatus set forth in claim 1, wherein:
   said inner chamber is longitudinally movable relative to said tank and said sidewall and said bottom are substantially closed except for said opening in said bottom so as to form a floatable chamber;
   said drive means has means for rotating said chamber and said arms when said chamber has floated upwardly a predetermined distance; and
   the liquid in said chamber being rendered lighter in density than the liquid externally thereof by the gas to cause said chamber to float upwardly said predetermined distance for thereby actuating said drive means.

3. The structure set forth in claim 2 wherein said drive means includes:
   an annular track at the upper end of said chamber; and
   a drive wheel engageable with said track for rotating said track and said chamber therewith for thereby also rotating said arms.

4. The structure set forth in claim 1, wherein:
   said secondary recirculation opening is located at substantially the center of said bottom of said chamber;
   each of said arms has a hollow bore throughout substantially its full length and communicating at its inner end with said secondary recirculation opening at the central portion of said chamber; and
   each of said arms has a plurality of inlet openings longitudinally spaced throughout its length and communication with said hollow bore to thereby establish fluid flow into said chamber from substantially the full bottom area of said tank as said arms are rotated.

5. The structure set forth in claim 1, including:
   a cylindrical baffle wall extending downwardly from the upper end of said tank to substantially said bottom thereof and having an opening at the lower end;
   said baffle wall being disposed between the exterior of said chamber and said sidewall of said tank to form said clarification and sedimentation section with a longitudinal flow channel to said section from said discharge at the upper end of said chamber.

6. The structure set forth in claim 5, wherein; said baffle wall is formed with a plurality of removable lower sections to adjust the height of the quiescent zone in said clarification and sedimentation section.

7. The structure set forth in claim 1, including; a double wall enclosed flotation chamber formed in said bottom of said mixing and reaction chamber to control the floatability of said mixing and reaction chamber in said tank.

8. The structure set forth in claim 1, including; a propellar disposed near the lower end of said chamber for assisting in mixing within said chamber.

9. The structure set forth in claim 1, wherein said drive means for rotating said arms includes:
   a drive track on said chamber;
   a plurality of wheels upon which said drive track is rotatably supported; and
   power means for driving at least one of said wheels for thereby rotating said track and said chamber therewith.